United States Patent
Zhu

(10) Patent No.: US 12,524,919 B2
(45) Date of Patent: Jan. 13, 2026

(54) POINT CLOUD CODING/DECODING METHOD AND APPARATUS, DEVICE AND STORAGE MEDIUM

(71) Applicant: Tencent Technology (Shenzhen) Company Limited, Shenzhen (CN)

(72) Inventor: Wenjie Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 247 days.

(21) Appl. No.: 18/369,012

(22) Filed: Sep. 15, 2023

(65) Prior Publication Data

US 2024/0037799 A1     Feb. 1, 2024

Related U.S. Application Data

(63) Continuation of application No. PCT/CN2022/109523, filed on Aug. 1, 2022.

(51) Int. Cl.
    *G06T 9/00* (2006.01)
(52) U.S. Cl.
    CPC .................. *G06T 9/001* (2013.01)
(58) Field of Classification Search
    None
    See application file for complete search history.

(56) References Cited

U.S. PATENT DOCUMENTS 10,904,564 B2 * 1/2021 Yea .......................... H04N 19/23
11,010,931 B2 * 5/2021 Yea ......................... H04N 19/147
11,308,651 B2 * 4/2022 Hur .......................... H04N 19/70
11,328,440 B2 * 5/2022 Hur ............................. G06T 9/40
11,812,058 B2 * 11/2023 Gao ........................ H04N 19/147
11,823,424 B2 * 11/2023 Hur ........................... G06T 9/001
11,830,212 B2 * 11/2023 Hur ........................... G06T 17/00

(Continued)

FOREIGN PATENT DOCUMENTS

CN         111145090 A      5/2020
CN         111405281 A      7/2020

(Continued)

OTHER PUBLICATIONS

Tencent Technology, ISR, PCT/CN2022/109523, Sep. 29, 2022, 2 pgs.

(Continued)

*Primary Examiner* — Anand P Bhatnagar
(74) *Attorney, Agent, or Firm* — Morgan, Lewis & Bockius LLP

(57) ABSTRACT

This application provides a point cloud decoding performed by an electronic device. The method includes: obtaining a current point to be decoded from a point cloud code stream, the current point comprising N types of attribute information, and N being an integer greater than 1; determining M attribute groups of the N types of attribute information of the current point, M being a positive integer less than N; and perform uniform decoding for each attribute information in a same attribute group of the current point using a first operation, the first operation comprising at least one of a neighbor point determination and an attribute predicted value calculation. According to this application, the point cloud decoding method avoids the repeated searching, reduces time complexity during attribute decoding and improves attribute decoding efficiency.

20 Claims, 6 Drawing Sheets

(56) References Cited

U.S. PATENT DOCUMENTS

| | | | |
|---|---|---|---|
| 11,836,954 B2* | 12/2023 | Dai | G06T 9/005 |
| 11,910,017 B2* | 2/2024 | Zhu | G06T 9/004 |
| 12,003,768 B2* | 6/2024 | Ramasubramonian | H04N 19/136 |
| 12,073,591 B2* | 8/2024 | Sugio | H04N 19/593 |
| 12,198,368 B2* | 1/2025 | Hur | H04N 19/70 |
| 2019/0311501 A1* | 10/2019 | Mammou | G06T 9/001 |
| 2020/0021844 A1* | 1/2020 | Yea | H04N 19/124 |
| 2021/0209813 A1* | 7/2021 | Hur | H04N 19/70 |
| 2022/0210472 A1* | 6/2022 | Gao | G06T 9/004 |

FOREIGN PATENT DOCUMENTS

| | | | |
|---|---|---|---|
| CN | 111435991 A | | 7/2020 |
| CN | 112565734 A | | 3/2021 |
| WO | WO 2021066626 A1 | | 4/2021 |

OTHER PUBLICATIONS

Tencent Technology, WO, PCT/CN2022/109523, Sep. 29, 2022, 3 pgs.

Tencent Technology, IPRP, PCT/CN2022/109523, Feb. 27, 2024, 4 pgs.

Tencent Technology, Extended European Search Report, EP Patent Application No. 22860188.6, Nov. 14, 2024.

Hui Yuan et al., "[G-PCC] [Software] TM13v12.0 Bug Fix", International Organization for Standardization, Coding of Moving Pictures and Audio, ISO/IEC JTC 1/SC 29/WG7 MPEG2024/M56649, Apr. 2021, 3 pgs.

Hyejung Hur et al., "[G-PCC] [New Proposal] on Possible Reduction of Attribute Coding Time for Cats-Fused Dataset", International Organization for Standardization, Coding of Moving Pictures and Audio, ISO/IEC JTC1/SC29/WG11 MPEG2019/M51092, Oct. 2019, 3 pgs.

* cited by examiner

POINT CLOUD CODING/DECODING METHOD AND APPARATUS, DEVICE AND STORAGE MEDIUM

CROSS-REFERENCE TO RELATED APPLICATIONS

This application is a continuation application of PCT Patent Application No. PCT/CN2022/109523, entitled "POINT CLOUD CODING/DECODING METHOD AND APPARATUS, DEVICE AND STORAGE MEDIUM" filed on Aug. 1, 2022, which claims priority to Chinese Patent Application No. 202110982493.3, entitled "POINT CLOUD CODING/DECODING METHOD AND APPARATUS, DEVICE AND STORAGE MEDIUM" filed with the Chinese Patent Office on Aug. 25, 2021, all of which is incorporated herein by reference in its entirety.

FIELD OF THE TECHNOLOGY

Embodiments of this application relate to the technical field of video coding/decoding, and in particular to a point cloud coding/decoding method and apparatus, a device and a storage medium.

BACKGROUND OF THE DISCLOSURE

The object surface is collected by a collection device to form point cloud data that includes hundreds of thousands or even more points. During the video production process, the point cloud data is transmitted between a video production device and a video coding device in the form of point cloud media files. However, such a large number of points poses a challenge for transmission, so the video production device needs to compress the point cloud data and then transmit it.

The compression of point cloud data mainly includes compression of location information and compression of attribute information. The point cloud includes multiple types of attribute information, which are compressed separately to code the attribute information of the point cloud.

However, when the multiple types of attribute information of the point cloud are separately coded and/or decode, there are repeated operations, resulting in high time complexity and low coding/decoding efficiency.

SUMMARY

This application provides a point cloud coding/decoding method and apparatus, a device and a storage medium, to reduce time complexity of coding/decoding of point clouds and improve coding/decoding efficiency.

In a first aspect, this application provides a point cloud coding method performed by an electronic device, the method including:
  acquiring a current point to be coded in a point cloud, the current point including N types of attribute information, and N being an integer greater than 1;
  grouping the N types of attribute information of the current point to obtain M attribute groups of the current point, M being a positive integer less than N; and
  performing uniform attribute coding for attribute information in a same attribute group of the current point using a first operation, the first operation comprising at least one of a neighbor point determination and an attribute predicted value calculation.

In a second aspect, this application provides a point cloud decoding method, including:
  obtaining a current point to be decoded from a point cloud code stream, the current point comprising N types of attribute information, and N being an integer greater than 1;
  determining M attribute groups of the N types of attribute information of the current point, M being a positive integer less than N; and
  perform uniform decoding for each attribute information in a same attribute group of the current point using a first operation, the first operation comprising at least one of a neighbor point determination and an attribute predicted value calculation.

In a third aspect, this application provides an electronic device, including a processor and a memory. The memory is configured to store a computer program, and the processor is configured to invoke and run the computer program stored in the memory and cause the electronic device to perform the method in the first aspect or various implementations thereof.

In a fourth aspect, this application provides an electronic device, including a processor and a memory. The memory is configured to store a computer program, and the processor is configured to invoke and run the computer program stored in the memory and cause the electronic device to perform the method in the second aspect or various implementations thereof.

In a
In a fifth aspect, this application provides a chip, configured to implement the method in any one of the first aspect to the second aspect or various implementations thereof. Specifically, the chip includes: a processor, configured to invoke and run a computer program from a memory such that a device installed with the chip executes the method in any one of the first aspect to the second aspect or various implementations thereof.

In a ninth aspect, this application provides a non-transitory computer-readable storage medium for storing a computer program. The computer program causes an electronic device to execute the method in any one of the first aspect to the second aspect or various implementations thereof.

Based on the above, the N types of attribute information of the current point are grouped to obtain M attribute groups of the current point, M being a positive integer less than N; and for each attribute information in the same attribute group of the current point, the first operation in attribute coding or decoding is shared to perform uniform coding or decoding. That is, according to this application, the N types of attribute information of the current point are grouped, and for each attribute information in the same attribute group, the first operation in attribute coding or decoding is shared to perform uniform coding or decoding, which avoids the repeated searching, reduces time complexity during attribute coding/decoding and improves attribute coding/decoding efficiency.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
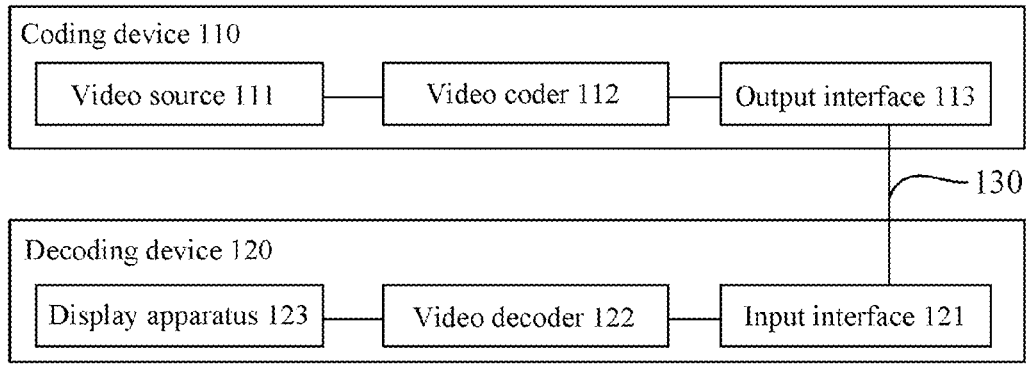
FIG. 1 is a schematic block diagram of a point cloud video coding/decoding system involved in the embodiments of this application.

Technical solutions in embodiments of this application are described below with reference to the accompanying drawings in the embodiments of this application.

It is to be understood that in this embodiment of the present disclosure, "B corresponding to A" means that B is associated with A. In one implementation, B can be determined based on A. However, it is also to be understood that determining B based on A does not mean determining B based on A alone; B may also be determined based on A and/or other information.

In the description of this application, unless otherwise specified, "a plurality of" means two or more than two.

In addition, in order to clearly describe the technical solution of the embodiments of this application, the terms "first" and "second" are used in the embodiments of this application to distinguish the same or similar items that have basically the same function and effect. A person skilled in the art can understand that the terms "first" and "second" do not limit the number and order of execution, and the terms "first" and "second" are not necessarily different.

The solutions provided by this application may also involve coding/decoding standards or technologies.

The solutions provided by the embodiments of this application may be applied to the technical field of digital video coding, for example, image coding/decoding, video coding/decoding, hardware video coding/decoding, specific circuit video coding/decoding and real-time video coding/decoding. Alternatively, the solutions provided by the embodiments of this application may be combined with Audio Video coding Standard (AVS), second generation AVS (AVS2) or third generation AVS (AVS3), specifically including, but not limited to, H.264/Audio Video coding (AVC) standard, H.265/High Efficiency Video Coding (HEVC) standard and H.266/Versatile Video Coding (VVC) standard. Alternatively, the solutions provided by the embodiments of this application may be combined with other proprietary or industry standards, which, exemplarily, may include ITU-TH.261, ISO/IECMPEG-1Visual, ITU-TH.262 or ISO/IECMPEG-2Visual, ITU-TH.263, ISO/IECMPEG-4Visual, ITU-TH.264 (which may also be called ISO/IECMPEG-4AVC) and also include Scalable Video Codec (SVC) and Multi-View Video Codec (MVC) extensions.

In addition, the solutions provided by the embodiments of this application may be used for lossy compression of images and lossless compression of images. The lossless compression may be visually lossless compression or mathematically lossless compression.

The solutions provided by the embodiments of this application may also involve in-vehicle technology.

Exemplarily, the client involved in this application may be a user terminal. In some embodiments, the user terminal includes, but not limited to, a mobile phone, a computer, a smart voice interaction device, a smart home appliance, an in-vehicle terminal, an aircraft and the like.

In order to facilitate the understanding of the embodiments of this application, the relevant concepts involved in the embodiments of this application are first briefly introduced as follows:

A point cloud is a set of discrete points in space that are irregularly distributed and express the spatial structure and surface attributes of a three-dimensional object or three-dimensional scene.

Point cloud data is a concrete record form of point cloud, and a point in the point cloud may include location information of the point and attribute information of the point. For example, the location information of the point may be three-dimensional coordinate information of the point. The location information of the point may also be called geometric information of the point. For example, the attribute information of the point may include color information and/or reflectivity, etc. For example, the color information may be information in any color space. For example, the color information may be (RGB). For another example, the color information may be luma-chroma (YcbCr, YUV) information. For example, Y denotes luma, Cb (U) denotes blue color difference, Cr (V) denotes red, and U and V are denoted as chroma for describing color difference information. For example, a point in a point cloud obtained according to a laser measurement principle may include three-dimensional coordinate information of the point and laser reflectance of the point. For another example, a point in a point cloud obtained according to a photogrammetry principle may include three-dimensional coordinate information of the point and color information of the point. For another example, a point in a point cloud obtained according a combination of the laser measurement principle and the photogrammetry principle may include three-dimensional coordinate information of the point, laser reflectance of the point and color information of the point.

Point cloud data may be acquired by, but not limited to, at least one of the following methods: (1) computer devices: computer devices may generate point cloud data according to virtual three-dimensional objects and virtual three-dimensional scenes; (2) 3D (3-Dimension) laser scanning: point cloud data of a three-dimensional object or a three-dimensional scene in the static real world may be acquired by 3D laser scanning, millions of points per second; (3) 3D photogrammetry: a visual scene of the real world is collected by a 3D photography device (i.e., a group of cameras or a camera device having multiple lenses and sensors) to obtain point cloud data of the vision scene in the real world, and point cloud data of a three-dimensional object or a three-dimensional scene in the dynamic real world may be obtained by 3D photography; and (4) medical devices: point cloud data of biological tissues and organs may be acquired by medical devices for Magnetic Resonance Imaging (MRI), Computed Tomography (CT) and electromagnetic positioning in the medical field.

According to the acquisition methods, the point clouds may be classified into: dense point clouds and sparse point clouds.

According to the time series type of data, the point clouds are classified into:
first static point clouds: the object is still, and the device for acquiring point clouds is also still;
second type dynamic point clouds: the object is moving, but the device for acquiring point clouds is still; and
third type dynamically acquired point clouds: the device for acquiring point clouds is moving.

According to the purposes, the point clouds are classified into:
Category I: machine perceived point clouds, which can be used in scenes such as an autonomous navigation system, a real-time inspection system, a geographic information system, a visual sorting robot, a rescue robot, etc.; and
Category II: human eye perceived point clouds, which can be used in point cloud application scenes such as digital cultural heritage, free viewpoint broadcasting, three-dimensional immersive communication, three-dimensional immersive interaction, etc.

FIG. 1 is a schematic block diagram of a point cloud video coding/decoding system involved in the embodiments of this application. FIG. 1 is only an example. The point cloud video coding/decoding system of the embodiments of this application includes, but not limited to, that shown in FIG. 1. As shown in FIG. 1, the point cloud video coding/decoding system 100 includes a coding device 110 and a decoding device 120. The coding device is configured to code (which can be understood as compress) point cloud data to generate a code stream and transmit the code stream to the decoding device. The decoding device is configured to decode the code stream generated by the coding device to obtain decoded point cloud data.

In the embodiments of this application, the coding device 110 can be understood as a device with a video coding function, and the decoding device 120 can be understood as a device with a video decoding function. The coding device 110 and the decoding device 120 in the embodiments of this application include a wider range of apparatuses, for example, including smart phones, desktop computers, mobile computing apparatuses, notebook (e.g., laptop) computers, tablet computers, set top boxes, televisions, cameras, display apparatuses, digital media players, video game consoles, vehicle-mounted computer, etc.

In some embodiments, the coding device 110 may transmit coded point cloud data (e.g., a code stream) to the decoding device 120 via a channel 130. The channel 130 may include one or more media and/or apparatuses capable of transmitting coded point cloud data from the coding device 110 to the decoding device 120.

In an example, the channel 130 includes one or more communication media that enables the coding device 110 to directly transmit coded point cloud data to the decoding device 120 in real time. In this example, the coding device 110 may modulate coded point cloud data according to communication standards, and transmit the modulated point cloud data to the decoding device 120. The communication media includes wireless communication media, such as radio-frequency spectrum. In some embodiments, the communication media may also include wired telecommunication media, such as one or more physical transmission lines.

In another example, the channel 130 includes a storage medium that can store point cloud data coded by the coding device 110. The storage medium includes a variety of local access data storage media, such as an optical disk, a DVD, a flash memory, etc. In this example, the decoding device 120 may acquire the coded point cloud data from the storage medium.

In another example, the channel 130 may include a storage server that can store point cloud data coded by the coding device 110. In this example, the decoding device 120 may download the stored coded point cloud data from the storage server. In some embodiments, the storage server may store coded point cloud data and transmit the coded point cloud data to the decoding device 120, and may be, for example, a web server (for example, for a website), a file transfer protocol (FTP) server, or the like.

In some examples, the coding device 110 includes a video coder 112 and an output interface 113. The output interface 113 may include a modulator/demodulator (modem) and/or a transmitter.

In some embodiments, in addition to the video coder 112 and the input interface 113, the coding device 110 may also include a video source 111.

The video source 111 may include at least one of a video collection apparatus (e.g., a video camera), a video archive, a video input interface and a computer graphics system. The video input interface is configured to receive point cloud data from a video content provider, and the computer graphics system is used for generating point cloud data.

The video coder 112 codes point cloud data from the video source 111 to generate a code stream. The video coder 112 directly/indirectly transmits the coded point cloud data to the decoding device 120 via the output interface 113. The coded point cloud data may also be stored in the storage medium or the storage server, so as to be read by the decoding device 120 subsequently.

In some embodiments, the decoding device 120 includes an input interface 121 and a video decoder 122.

In some embodiments, in addition to the input interface 121 and the video decoder 122, the decoding device 120 may also include a display apparatus 123.

The input interface 121 includes a receiver and/or a modem. The input interface 121 may receive coded point cloud data via the channel 130.

The video decoder 122 is configured to decode the coded point cloud data to obtain decoded point cloud data and transmit the decoded point cloud data to the display apparatus 123.

The display apparatus 123 displays the decoded point cloud data. The display apparatus 123 may be integrated with the decoding device 120 or external to the decoding device 120. The display apparatus 123 may include a variety of display apparatuses, such as a liquid crystal display (LCD), a plasma display, an organic light-emitting diode (OLED) display or other types of display apparatuses.

In addition, FIG. 1 is only an example, and the technical solution of the embodiments of this application is not limited to FIG. 1. For example, the technology of this application may also be applied to unilateral video coding or unilateral video decoding.

Since a point cloud is a collection of massive points. Storing the point cloud consumes a lot of memory, and moreover, it is not convenient for transmission. In addition, there is no such a large bandwidth to support direct transmission of the point cloud at the network layer without compression, so it is necessary to compress the point cloud.

Up to now, the point cloud can be compressed through a point cloud coding framework.

The point cloud coding framework may be a Geometry Point Cloud Compression (G-PCC) coding/decoding framework or a Video Point Cloud Compression (V-PCC) coding/decoding framework provided by Moving Picture Experts Group (MPEG), or an AVS-PCC coding/decoding framework provided by Audio Video Standard (AVS) organization. Both the G-PCC and the AVS-PCC are directed to static sparse point clouds, and their coding frameworks are roughly the same. The G-PCC coding/decoding framework may be used for compressing the first static point clouds and the third type dynamically acquired point clouds, and the V-PCC coding/decoding framework may be used for compressing the second type dynamic point clouds. The G-PCC coding/decoding framework may also be called a point cloud coder-decoder TMC13, and the V-PCC coding/decoding framework may also be called a point cloud coder-decoder TMC2.

The coding/decoding framework to the embodiments of this application will be described below in an example of the G-PCC coding/decoding framework.

Figure 2:
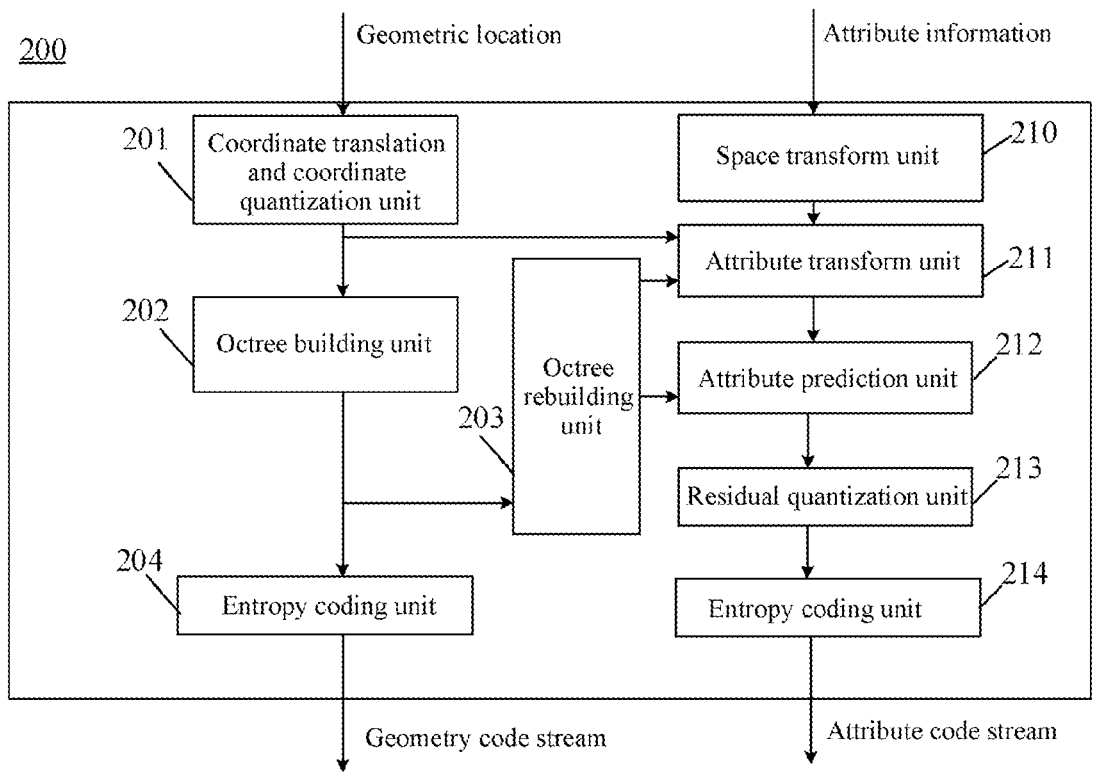
FIG. 2 is a schematic block diagram of a coding framework according to the embodiments of this application.

FIG. 2 is a schematic block diagram of a coding framework according to the embodiments of this application.

As shown in FIG. 2, the coding framework 200 may acquire location information (which may also be called geometric information or geometric location) and attribute information of a point cloud from a collection device. Coding of the point cloud includes location coding and attribute coding.

The location coding process includes: pre-processing on an original point cloud by coordinate transform and quantization for removing duplicate points, etc.; and building an octree, and performing coding to form a geometry code stream.

The attribute coding process includes: selecting one of three prediction modes to perform point cloud prediction according to rebuilt information of the location information and true values of the attribute information of the given input point cloud, quantizing the prediction result, and performing arithmetic coding to form an attribute code stream.

As shown in FIG. 2, the location coding may be realized by the following units:

a coordinate translation and coordinate quantization unit 201, an octree building unit 202, an octree rebuilding unit 203 and an entropy coding unit 204.

The coordinate translation and coordinate quantization unit 201 may be configured to transform the world coordinates of points in the point cloud into relative coordinates and quantize the coordinates, which can reduce the number of coordinates. After the quantization, previously different points may be given the same coordinates.

The octree building unit 202 may code location information of quantized points in an octree coding manner. For example, the point cloud may be divided in the form of an octree. Thereby, the locations of the points may be in one-to-one correspondence to the locations of the octree. By counting the locations of points in the octree and denoting their flag as 1, geometry encoding can be carried out.

The octree rebuilding unit 203 is configured to rebuild geometric locations of points in the point cloud to obtain rebuilt geometric locations of the points.

The entropy coding unit 204 may perform arithmetic coding on the location information outputted by the octree building unit 202 in an entropy coding manner, i.e., generate a geometry code stream from the location information outputted by the octree building unit 202 in an arithmetic coding manner. The geometry code stream may also be called a geometry bit stream.

The attribute coding may be realized by the following units:

a space transform unit 210, an attribute transform unit 211, an attribute prediction unit 212, a residual quantization unit 213 and an entropy coding unit 214.

The space transform unit 210 may be configured to transform an RGB color space of a point in the point cloud into YCbCr format or other formats.

The attribute conversion unit 211 may be configured to convert attribute information of a point in the point cloud so as to minimize attribute distortion. For example, the attribute conversion unit 211 may be configured to obtain a true value of the attribute information of the point. For example, the attribute information may be color information of the point.

The attribute prediction unit 212 may be configured to predict attribute information of a point in the point cloud to obtain a predicted value of the attribute information of the point, thereby obtaining a residual of the attribute information of the point based on the predicted value of the attribute information of the point. For example, the residual of the attribute information of the point may be the true value of the attribute information of the point minus the predicted value of the attribute information of the point.

The residual quantization unit 213 may be configured to quantize a residual of attribute information of a point.

The entropy coding unit 214 may perform entropy coding on the residual of the attribute information of the point by zero run length coding to obtain an attribute code stream. The attribute code stream may be bit stream information.

Referring to FIG. 2, for the geometry coding of this application, the main operations and processing are as follows:

(1) Pre-processing: The pre-processing includes transform coordinates and voxelize. By the operations of scaling and translation, the point cloud data in a 3D space is converted into an integer form, and its minimum geometric location is moved to the origin of coordinates.

(2) Geometry encoding: The geometry encoding includes two modes that can be used under different conditions.

(a) Octree: The octree is a tree form data structure. In 3D space partitioning, a preset bounding box is uniformly partitioned, and each has eight child nodes. By using '1' and '0' to indicate the occupation of each child node of the octree, occupancy codes are obtained as a code stream of geometric information of the point cloud.

(b) Trisoup: The point cloud is partitioned into blocks with a certain size, intersection points of the point cloud surface at the edges of the blocks are located, and triangles are constructed. The compression of the geometric information is realized by coding the locations of the intersection points.

(3) Geometry quantization: The fineness of quantization is usually determined by the quantization parameter (QP). A larger value of the QP indicates that coefficients with a larger range of values will be quantized into the same output, and therefore usually results in greater distortion and lower code rate. Conversely, a smaller value of the QP indicates that coefficients with a smaller range of values will be quantized into the same output, and therefore generally results in smaller distortion and correspondingly higher code rate. In point cloud coding, quantization is performed directly on coordinate information of the point.

(4) Geometry entropy encoding: Statistical compression coding is performed on the occupancy codes of the octree to finally output a binary (0 or 1) compressed code stream. Statistical coding is a lossless coding manner that can effectively reduce the code rate required to express the same signal. A commonly used statistical coding manner is Content Adaptive Binary Arithmetic Coding (CABAC).

For the attribute information coding, the main operations and processing are as follows:

(1) Recoloring: In a case of lossy coding, after the geometric information coding, the coder side needs to decode and rebuild the geometric information, i.e., recover coordinate information of each point of the 3D point cloud. Attribute information of corresponding one or more neighbor points are searched out in the original point cloud as the attribute information of the rebuilt point.

(2) Prediction: During the prediction, one or more point are selected as the predicted value for the neighborhood of the geometric information or attribute information, and the weighted average is calculated to obtain the final attribute predicted value; and the difference between the true value and the predicted value is coded.

(3) Transform: The transform includes three modes that can be used under different conditions.

(a) Predicting Transform: The point cloud is divided into several different Levels of Detail (LoD) by selecting the subset of points according to the distance, thereby realizing point cloud representation from rough to fine. Bottom-up prediction can be realized between neighboring levels, i.e., the attribute information of the point introduced in the fine level is predicted based on the neighboring points in the coarse level to obtain the corresponding residual signal. The point on the bottommost level is coded as reference information.

(b) Lifting Transform: On the basis of LoD-based neighboring level prediction, a weight update strategy of neighboring points is introduced to finally obtain predicted attribute values of each point, thereby obtaining the corresponding residual signal.

(c) Region Adaptive Hierarchical Transform (RAHT): The attribute information is subjected to RAHT such that the signal is transformed into the transform domain, which is called transform coefficient.

(4) Attribute quantization: The fineness of quantization usually depends on the quantization parameter (QP). In the predicting transform and the lifting transform, the residual is quantized and then subjected to entropy coding. In the RAHT, the transform coefficient is quantized and then subjected to entropy coding.

(5) Attribute entropy coding: Typically, the quantized attribute residual signal or transform coefficient is finally compressed by run length coding and arithmetic coding. The information such as the corresponding coding mode, quantization parameter, etc. are also coded by an entropy coder.

Figure 3:
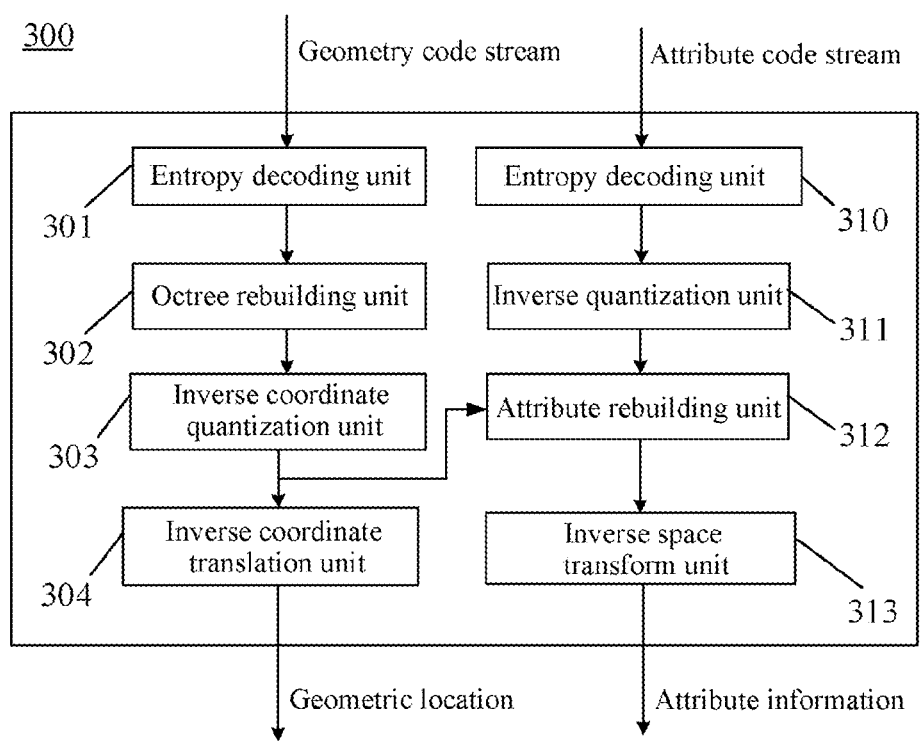
FIG. 3 is a schematic block diagram of a decoding framework according to the embodiments of this application.

FIG. 3 is a schematic block diagram of a decoding framework according to the embodiments of this application.

As shown in FIG. 3, the decoding framework 300 may acquire a code stream of a point cloud from a coding device, and analyze the code stream to obtain location information and attribute information of points in the point cloud. The decoding of the point cloud includes location decoding and attribute decoding.

The location decoding process includes: performing arithmetic decoding on the geometry code stream; building an octree and performing merging to rebuild the location information of the point, thereby obtaining rebuilt information of the location information of the point; and the performing coordinate transform on the rebuilt information of the location information of the point to obtain the location information of the point. The location information of the point may also be called geometric information of the point.

The attribute decoding process includes: analyzing the attribute code stream to obtain the residual of the attribute information of the point in the point cloud; inversely quantizing the residual of the attribute information of the point to obtain the inversely quantized residual of the attribute information of the point; selecting one of the three prediction modes to perform point cloud prediction according to rebuilt information of the location information of the point acquired during the location decoding process to obtain a rebuilt value of the attribute information of the point; and performing color space inverse transform on the rebuilt value of the attribute information of the point to obtain the decoded point cloud.

As shown in FIG. 3, the location decoding may be realized by the following units:

an entropy decoding unit 301, an octree rebuilding unit 302, an inverse coordinate quantization unit 303 and an inverse coordinate translation unit 304.

The attribute decoding may be realized by the following units:

an entropy decoding unit 310, an inverse quantization unit 311, an attribute rebuilding unit 312 and an inverse space transform unit 313.

Decompression is the inverse process of compression. Similarly, for the functions of the units in decoding framework 300, reference may be made to the functions of the corresponding units in the coding framework 200.

At the decoder side, after the decoder obtains a compressed code stream, entropy decoding is performed first to obtain various mode information, and quantized geometric information and attribute information. First, the geometric information is subjected to inverse quantization to obtain rebuilt 3D point location information. The attribute information is subjected to inverse quantization to obtain residual information, and a reference signal is confirmed according to the adopted transform mode to obtain rebuilt attribute information, the rebuilt attribute information is in one-to-one correspondence to the geometric information in sequence to generate rebuilt point cloud data as the output.

For example, the decoding framework 300 may partition the point cloud into a plurality of LoDs according to the Euclidean distance between points in the point cloud; then, the decoding framework may decode the attribute information of the points in the LoDs, for example, calculate the zero_cnt in the zero run length coding technology so as to decode the residual based on the zero_cnt; and next, the decoding framework 300 may perform inverse quantization based on the decoded residual, and add the residual obtained after inverse quantization to the predicted value of the current point to obtain the rebuilt value of the point cloud until the entire point cloud is decoded. The current point will serve as the nearest neighbor of the subsequent points in the LoD, and the attribute information of the subsequent points will be predicted based on the rebuilt value of the current point.

As can be seen from FIG. 2, the point cloud coding framework 200 mainly includes two parts in terms of functions: a location coding module and an attribute coding module. The location coding module is configured to code location information of the point cloud to form a geometry code stream. The attribute coding module is configured to code attribute information of the point cloud to form an attribute code stream. This application mainly involves coding of attribute information.

Mode information or parameter information such as prediction, quantization, coding and filtering determined by the coder side during attribute information coding is carried in the attribute code stream. The decoder side determines mode information or parameter information such as prediction, quantization, coding and filtering, which is the same as that of the coder side, by analyzing the attribute code stream and analyzing the existing information, thereby ensuring the rebuilt value of the attribute information obtained by the coder side to be the same as the rebuilt value of the attribute information obtained by the decoder side.

The above has described the basic flow of the point cloud coder-decoder based on the G-PCC coding/decoding framework. With the development of technology, some modules or steps of the framework or flow may be optimized. This application is applicable to the basic flow of the point cloud coder-decoder based on the G-PCC coding/decoding framework, but is not limited to the framework and flow.

Figure 4A:
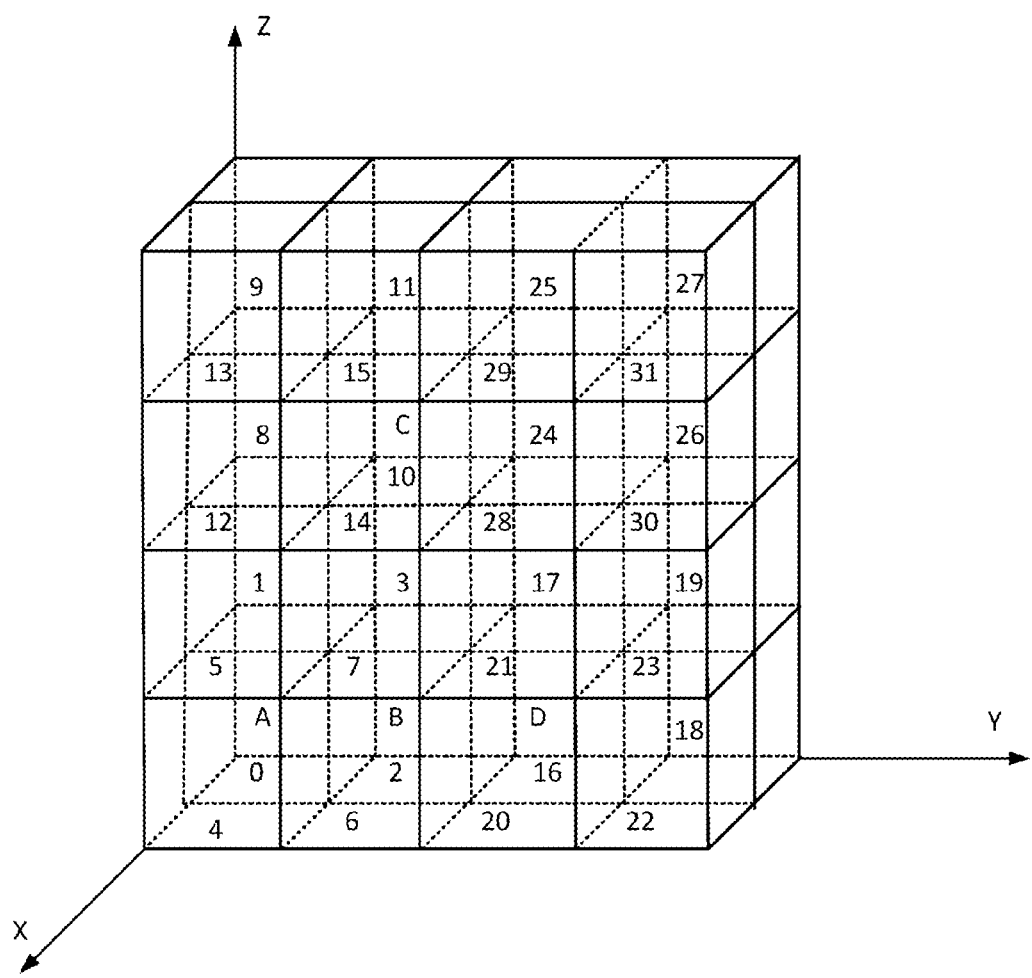
FIG. 4A is a schematic diagram of a point cloud sorting manner involved in the embodiments of this application.

The coding technology involved in this application will be summarized below:

1. Prediction (1) Prediction of Reflectivity i) Selection of Neighbor Point in Morton Order This method finds k coded points of the current point as neighbors by Morton code offsetting. The specific method is as follows: coordinates of all points of the point cloud are acquired and sorted to obtain a Morton order 1, as shown in FIG. 4A.

Figure 4B:
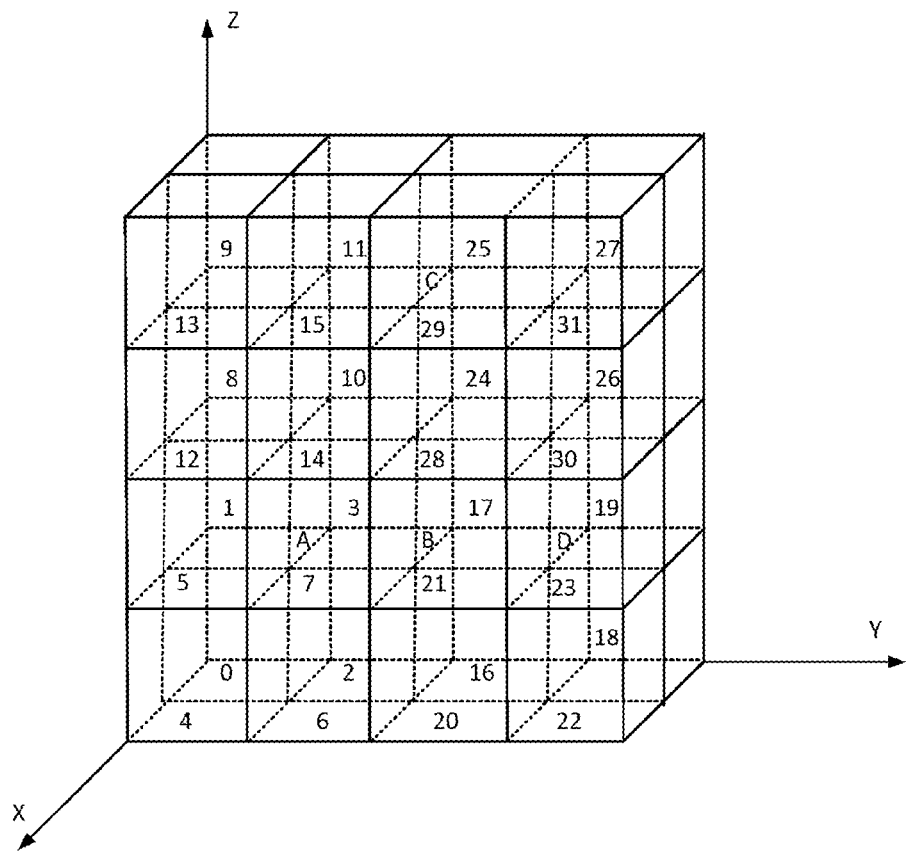
FIG. 4B is a schematic diagram of another point cloud sorting manner involved in the embodiments of this application.

In some embodiments, a fixed value (j1,j2,j3) is added to the coordinates (x,y,z) of all the points of the point cloud, and Morton codes corresponding to the point cloud are generated based on the new coordinates (x+j1,y+j2,z+j3), and then sorted to obtain a Morton order 2, as shown in FIG. 4B. A, B, C and D in FIG. 2 are moved to different positions in FIG. 4B, and the corresponding Morton codes are also changed, but their relative positions remain unchanged. In addition, in FIG. 4B, the Morton code of Point D is 23, and the Morton code of its neighbor point B is 21, so Point B can be found by identifying at most two points forward from Point D. However, in FIG. 4A, it is required to search out at most 14 points forward from Point D (Morton code 16) to find Point B (Morton code 2).

Decoding is performed according to the Morton order. The nearest predicted point of the current point is searched out. For example, N points prior to the current point in Morton order 1 are selected as candidates. N is greater than or equal to 1. M points prior to the current point in Morton order 2 are selected as candidates. M is greater than or equal to 1.

In the N points and the M points, a distance d from each point to the current point is calculated. The coordinates of the current point are (x,y,z), and the coordinates of the candidates are (x1,y1,z1). The calculation method of the distance d is d=|x−x1|+|y−y1|+|z−z1|. k decoded points having the smallest distance are selected from these N+M points as the predicted points of the current point.

In some embodiments, j1=j2=j3=42, k=3 and N=M=4.

ii) Selection of Neighbor Points in Hilbert Order k points having the shortest distance from the current point are searched out from the max Num Of Neighbours prior to the current coded point in Hilbert order.

In some embodiments, the max Num Of Neighbours is 128 by default, and k is 3 by default. The calculation method of the distance is Manhattan distance, i.e., d=|x1−x2|+|y1−y2|+|z1−z2|. In some embodiments, the calculation method of the distance may also be other methods.

iii) Calculation of Predicted Value

By using the reciprocal of the Manhattan distance between the neighbor and the current point as the weight, a weighted average of attribute rebuilt values of the k neighbors is finally calculated to obtain the attribute predicted value.

In an example, the attribute weight of the neighbor point is determined according to the following Formula (1):

$$w_{ij} = \frac{1}{|xi - xij| + |yi - yij| + |zi - zij|} \quad (1)$$

where $w_{ij}$ is the attribute weight of the $j^{th}$ neighbor point of the current point i, (xi,yi,zi) is the geometric information of the current point, and (xij,yij,zij) is the geometric information of the $j^{th}$ neighbor point.

In another example, in the weight calculation in Formula (1), the components in x, y, z directions are different weights, and then, the weight of each neighbor is calculated according to the following Formula (2):

$$w_{ij} = \frac{1}{a|xi - xij| + b|yi - yij| + c|zi - zij|} \quad (2)$$

where a is the weight coefficient of the first component of the current point, b is the weight coefficient of the second component of the current point, and c is the weight coefficient of the third component of the current point. In some embodiments, a, b and c may be obtained by looking up a table, or may be preset fixed values.

After the attribute weight of the neighbor point is determined according to the above formulae, the attribute predicted value of the current point is calculated according to the following formula (3):

$$\hat{A}_i = \frac{\sum_{j=1}^{k} w_{ij} \hat{A}_{ij}}{\sum_{j=1}^{k}} \quad (3)$$

where $\hat{A}_{ij}$ is the rebuilt value of the attribute information of the $j^{th}$ neighbor point, j=0, 1, . . . , k, and $\hat{A}_i$ is the predicted value of the attribute information of the current point.

The above has introduced the process of determining the predicted value of the reflectivity in an example where the attribute information is the reflectivity. For the prediction process of other attribute information, reference may be made to the introduction of the related art, so the details are not repeated here.

In the existing point cloud attribute prediction process, multiple attributes of the point cloud are predicted separately, and the attribute prediction processes are independent of each other, which leads to higher time complexity and low coding/decoding efficiency due to repeated searching.

In order to solve the above technical problems, the N types of attribute information of the current point are grouped, and for each attribute information in the same attribute group, the first operation in attribute coding or decoding is shared to perform uniform coding or decoding, which avoids the repeated searching, reduces time complexity during attribute coding/decoding and improves attribute coding/decoding efficiency.

The technical solution of this application will be described in detail below:

First, a point cloud coding method provided by an embodiment of this application will be described in an example of a coder side.

Figure 5:
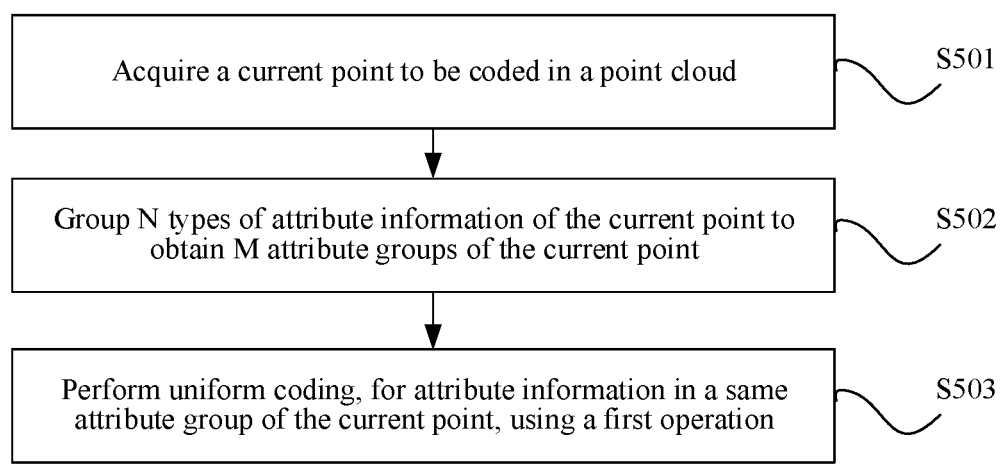
FIG. 5 is a flowchart of a point cloud coding method according to an embodiment of this application.

FIG. 5 is a flowchart of a point cloud coding method according to an embodiment of this application. The execution subject of the method is an apparatus with a point cloud attribute information coding function, such as a point cloud coding apparatus. The point cloud coding apparatus may be the above-mentioned point cloud coding device or a part of the point cloud coding device. For the convenience of description, the following embodiment will be described in an example where the execution subject is the point cloud coding device. As shown in FIG. 5, the method of this embodiment includes:

S501: Acquire a current point to be coded in a point cloud.

The current point includes N types of attribute information, and N is an integer greater than 1.

The point cloud in this embodiment of this application may refer to a whole point cloud or a partial point cloud, for example, the partial point cloud obtained by octree or other manners, such as a subset of the whole point cloud.

The point cloud coding device may acquire the point cloud in the following manners:

Manner I: If the point cloud coding device has a point cloud collection function, then the point cloud may be collected by the point cloud coding device.

Manner II: The point cloud is acquired from the point cloud coding device or other storage devices, for example, the point cloud collection device stores the collected point cloud in a storage device, and the point cloud coding device reads the point cloud from the storage device.

Manner III: The point cloud is acquired by the point cloud coding device from the point cloud collection device, for example, the point cloud collection device transmits the collected point cloud to the point cloud coding device.

If the point cloud is the whole point cloud, then the point cloud coding device will obtain the whole point cloud in the above-mentioned manners as the research object of this application for subsequent coding steps.

If the above-mentioned point cloud is the partial point cloud, then the point cloud coding device will obtain the whole point cloud in the above-mentioned manners and partition the whole point cloud to obtain the partial point cloud. For example, the point cloud coding device partitions the whole point cloud by octree or quadtree, and the partial point cloud corresponding to one node is used as the research object of this application for subsequent coding steps.

After the point cloud is obtained according to the above method, geometry encoding and attribute coding are performed on points in the point cloud. For example, the geometry encoding is performed first, and then the attribute coding is performed after the geometry encoding is finished. This application mainly involves attribute coding of the point cloud.

The attribute coding of the point cloud is point by point, and the current point may be understood as the point being coded in the point cloud.

In some embodiments, the current point including N types of attribute information may be understood as all the points in the point cloud including N types of attribute information. The attribute information coding process of all the points in the point cloud is the same as the attribute information coding process of the current point. This embodiment of this application will describe the attribute information coding process in an example of the current point.

The current point includes N types of attribute information. For example, the current point includes a color attribute, a reflectivity attribute, a normal vector attribute, a material attribute, etc.

S502: Group the N types of attribute information of the current point to obtain M attribute groups of the current point.

M is a positive integer less than N.

For example, the current point includes 4 types of different attribute information, and the 4 types of attribute information are placed into one attribute group. In this case, M=1.

For another example, the current point includes 4 types of different attribute information. 3 types of attribute information are placed into one attribute group, and the remaining one is placed in one attribute group. In this case, M=2.

For another example, the current point includes 4 types of different attribute information. 2 types of attribute information are placed into one attribute group, and the remaining 2 types of attribute information are placed in another attribute group. In this case, M=2.

For another example, the current point includes 4 types of different attribute information. 2 types of attribute information are placed into one attribute group, and the remaining 2 types of attribute information are respectively placed in two attribute groups. In this case, M=3.

As can be seen from the above, in the M attribute groups obtained by grouping the N types of attribute information of the current point in this embodiment, each attribute group includes at least one type of attribute information, and at least one of the M attribute groups includes at least two types of attribute information.

This application mainly describes the coding process of the attribute group in an example where the attribute group includes at least two types of attribute information.

For the attribute coding manner of the attribute group including one attribute information, reference may be made to the existing separate coding manner, or the coding manner of the attribute group including at least two types of attribute information.

In this embodiment, the manner of grouping the N types of attribute information of the current point may be a default manner, for example, it is preset to place the attribute information in the N types of attribute information into one attribute group.

The grouping manners of attribute information of all the points in the point cloud may be the same or different, or partly the same and partly different, which is not limited in this application and is determined according to the actual situation.

After the N types of attribute information of the current point are placed into M attribute groups according to the above manner, S503 is executed.

S503: Perform uniform coding, for attribute information in a same attribute group of the current point, using a first operation.

The first operation includes at least one of a neighbor point determination and an attribute predicted value calculation.

In this application, the performing uniform coding, for attribute information in the same attribute group, using the first operation in attribute coding may also be understood as performing the first operation coding on each attribute information in the same attribute group as a whole. For example, when the first operation is the neighbor point determination, the first operation on the attribute information in the attribute group will determine neighbor points as a part or all of neighbor points, and these neighbor points are shared, which avoids time complexity due to repeated searching and further improves attribute coding efficiency of the point cloud.

The attribute coding processes of different attribute groups are independent of each other. For example, different groups of attribute information are coded by different coding manners.

The first operation in this embodiment of this application is at least one of the neighbor point determination and the attribute predicted value calculation.

That is, the sharing the first operation in attribute coding for each attribute information in the same attribute group to perform uniform coding may be sharing the neighbor point determination for each attribute information in the same attribute group, i.e., each attribute information in the same attribute group shares the neighbor point determination to determine K neighbor points, and the K neighbor points are used as a part or all of neighbor points corresponding to each attribute information in the attribute group. Alternatively, each attribute information in the same attribute group shares the attribute predicted value calculation so as to be subjected to the uniform attribute predicted value calculation, for example, the calculation manners of the attribute predicted values of each attribute information in the attribute group may be the same. Alternatively, after each attribute information in the same attribute group shares the neighbor point determination such that the neighbor points are determined, the attribute predicted value calculation is shared, and the same calculation manner of the attribute predicted value is used to calculate the attribute predicted value of each attribute information in the attribute group.

In some embodiments, if the first operation includes the neighbor point determination, then S503 includes S503-A1 and S503-A2 as follows:

S503-A1: Search out, for each attribute group in the M attribute groups, K first neighbor points from coded points of the point cloud as common neighbor points of each attribute information in the attribute group.

S503-A2: Determine, according to the corresponding attribute information of the K first neighbor points, a predicted value of each attribute information of the current point in the attribute group.

In an example, the K neighbor points determined are used as all of neighbor points of at least one attribute information in the attribute group.

In an example, the K neighbor points determined are used as a part of neighbor points of at least one attribute information in the attribute group.

For example, assuming that the color attribute and the reflectivity attribute of the current point are placed into one attribute group, for this attribute group, K first neighbor points are selected from the coded points of the point cloud. The K first neighbor points are used as the common neighbor points of the color attribute and the reflectivity attribute of the current point, and the color predicted value and the reflectivity predicted value of the current point are respectively calculated according to the corresponding attribute information of the K first neighbor points. For example, the weighted average of the reflectivity's of the K first neighbor points is determined as the reflectivity predicted value of the current point, and the weighted average of the colors of the K first neighbor points is determined as the color predicted value of the current point.

In S503-A1, the manner of selecting the K first neighbor points from the coded points of the point cloud includes, but not limited to, the following manners:

Manner I: According to the coding sequence of the points in the point cloud, K first neighbor points having the shortest distance from the current point are selected from the coded points of the point cloud.

Manner II: According to coordinate information of the points in the point cloud, K first neighbor points having the shortest distance from the current point are selected from the coded points of the point cloud.

Manner III: According to coordinate information of the points in the point cloud, all coded points having a distance less than or equal to a threshold d are searched out from the coded points of the point cloud as the K first neighbor points of the current point.

The above-mentioned distance calculation manner may be Euclidean distance, Manhattan distance, weighted Manhattan distance, etc.

After the K first neighbor points are searched out from the coded points of the point cloud according to S503-A1 as the common neighbor points of each attribute information in the attribute group, S503-A2 is executed: determine, according to the corresponding attribute information of the K first neighbor points, a predicted value of each attribute information of the current point in the attribute group.

The determining, according to the corresponding attribute information of the K first neighbor points, a predicted value of each attribute information of the current point in the attribute group in S503-A2 is implemented by, but not limited to, the following manners:

Manner I: For each attribute information in the attribute group, an identical predicted value calculation manner is used to calculate the predicted value of each attribute information of the current point in the attribute group according to the corresponding attribute information of the K first neighbor points.

In an example, the average of the first attribute information of the K first neighbor points is determined as the predicted value of the first attribute information of the current point. The first attribute information is any attribute information in the attribute group.

For example, the attribute group includes a color attribute and a reflectivity attribute of the current point. The average of the color attributes of the K first neighbor points is determined as the predicted value of the color attribute of the current point. The average of the reflectivity attributes of the K first neighbor points is determined as the predicted value of the reflectivity attribute of the current point.

In another example, the weighted average of the first attribute information of the K first neighbor points is determined as the predicted value of the first attribute information of the current point. The first attribute information is any attribute information in the attribute group.

For example, the attribute group includes a color attribute and a reflectivity attribute of the current point. The weighted average of the color attributes of the K first neighbor points is determined as the predicted value of the color attribute of the current point. The weighted average of the reflectivity attributes of the K first neighbor points is determined as the predicted value of the reflectivity attribute of the current point.

Manner II: For each attribute information in the attribute group, an unidentical predicted value calculation manner is used to calculate the predicted value of each attribute information of the current point in the attribute group according to the corresponding attribute information of the K first neighbor points.

In a first example of Manner II, for each attribute information in the attribute group, different predicted value calculation manners are used respectively, and the predicted value of each attribute information of the current point in the attribute group is calculated according to the corresponding attribute information of the K first neighbor points.

For example, the attribute group includes a color attribute and a reflectivity attribute of the current point. The calculation manner of the predicted value of the color attribute is different from the calculation manner of the predicted value of the reflectivity attribute. For example, the average of the color attributes of the K first neighbor points is determined as the predicted value of the color attribute the current point, and the weighted average of the reflectivity attributes of the K first neighbor points is determined as the predicted value of the reflectivity attribute of the current point. Alternatively, the weighted average of the color attributes of the K first neighbor points is determined as the predicted value of the color attribute of the current point, and the average of the reflectivity attributes of the K first neighbor points is determined as the predicted value of the reflectivity attribute of the current point.

In a second example of Manner II, for a second attribute information in the attribute group, a weighted average of the second attribute information of the K first neighbor points is determined as a predicted value of the second attribute information of the current point; and for a third attribute information in the attribute group, L second neighbor points are searched out from the coded points of the point cloud, and according to the third attribute information of the K first neighbor points and the L second neighbor points, a predicted value of the third attribute information of the current point is determined. The second neighbor points are different from the first neighbor points, and the third attribute information is at least one attribute information in the attribute group other than the second attribute information.

For example, assuming that the attribute group includes a color attribute and a reflectivity attribute of the current point, the reflectivity attribute is denoted as the second attribute information, and the color attribute is denoted as the third attribute information. For the reflectivity attribute of the current point, the weighted average of the reflectivity attributes of the K first neighbor points is determined as the predicted value of the reflectivity attribute of the current point.

For the color attribute, on the basis of the K neighbor points, additional L second neighbor points are searched out. Specifically, L second neighbor points are searched out from the coded points of the point cloud. The second neighbor points are different from the first neighbor points. In this case, the neighbor points for the color attribute of the current point include the K first neighbor points and the L second neighbor points, and further, the predicted value of the color attribute of the current point is determined according to the color attributes of the K first neighbor points and the L second neighbor points. For example, the weighted average of the color attributes of the K first neighbor points and the L second neighbor points is determined as the predicted value of the color attribute of the current point.

The identifying L second neighbor points from the coded points of the point cloud at least includes:

Manner 1: The points having a distance of d2 from the current point are searched out from the coded points. The points are different from the first neighbor points.

Manner 2: A first distance d1 between a $K^{th}$ first neighbor point in the K first neighbor points and the current point is acquired; and the L second neighbor points having the first distance d1 from the current point are searched out in the coded points of the point cloud.

The above-mentioned distance calculation manner may be Euclidean distance, Manhattan distance, weighted Manhattan distance, etc.

The $K^{th}$ first neighbor point may be a first neighbor point having the largest distance from the current point in the K neighbor points.

According to the above manner, after each attribute information of the current point in the same attribute group shares the first operation in attribute coding to perform uniform coding, a point cloud code stream is formed.

In some embodiments, the point cloud code stream includes an indication information of the first operation shared during coding each type of attribute information in the N types of attribute information. In this way, when the decoder side decodes each type of attribute information, the first operation shared during coding the type of attribute information may be determined according to the indication information of the first operation, the attribute group of the attribute information may be determined, and further, for each attribute information in one attribute group, the first operation in attribute decoding is shared to perform uniform decoding, thereby improving decoding efficiency.

In some embodiments, the indication information of the first operation corresponding to each type of attribute information is used for indicating that the type of attribute information shares the neighbor point determination during determining the neighbor points, and/or that the type of attribute information shares the attribute predicted value calculation when calculating the attribute predicted value.

According to the point cloud coding method provided by the embodiments of this application, the current point to be coded in a point cloud is acquired, the current point including N types of attribute information, and N being an integer greater than 1; the N types of attribute information of the current point are grouped to obtain M attribute groups of the current point, M being a positive integer less than N; and for each attribute information in the same attribute group of the current point, the first operation in attribute coding is shared to perform uniform coding, the first operation including at least one of a neighbor point determination and an attribute predicted value calculation. That is, according to this application, the N types of attribute information of the current point are grouped, and for each attribute information in the same attribute group, the first operation in attribute coding or decoding is shared to perform uniform coding, which avoids the repeated searching, reduces time complexity during attribute coding and improves attribute coding efficiency.

The above has described the point cloud coding method provided by the embodiments of this application in an example of the coder side. The technical solution of this application will be described below in conjunction with FIG. 6 in an example of a decoder side.

Figure 6:
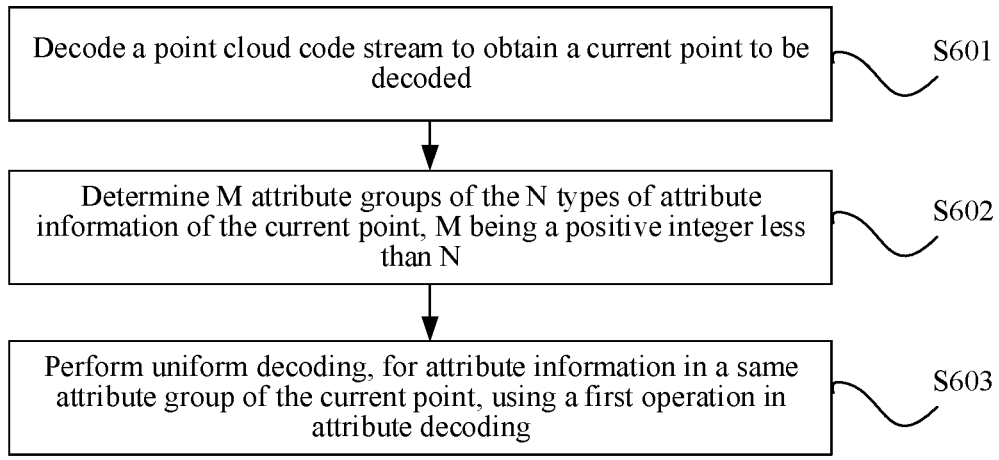
FIG. 6 is a flowchart of a point cloud decoding method according to an embodiment of this application.

FIG. 6 is a flowchart of a point cloud decoding method according to an embodiment of this application. The execution subject of the method is an apparatus with a point cloud attribute information decoding function, such as a point cloud decoding apparatus. The point cloud decoding apparatus may be the above-mentioned point cloud decoding device or a part of the point cloud decoding device. For the convenience of description, the following embodiment will be described in an example where the execution subject is the point cloud decoding device. As shown in FIG. 6, the process includes:

S601: Decode a point cloud code stream to obtain a current point to be decoded.

The current point includes N types of attribute information, and N is an integer greater than 1.

In this embodiment involves a decoding process of attribute information of the point cloud. The decoding of the attribute information of the point cloud is executed after location information of the point cloud is decoded. The location information of the point cloud is also called geometric information of the point cloud.

In this embodiment of this application, the decoded points may be understood as geometric information decoded points and attribute information decoded points. Specifically, the point cloud code stream includes a geometry code stream and an attribute code stream. The decoder side firstly decodes the geometry code stream of the point cloud to obtain a rebuilt value of geometric information of the point in the point cloud; and then decodes the attribute code stream of the point cloud to obtain a rebuilt value of the attribute information of the point in the point cloud, and obtains the decoded point cloud by combining the geometric information and the attribute information of the points in the point cloud. This embodiment of this application involves the decoding process of the attribute code stream of the point cloud.

In the decoding process of the attribute code stream of the point cloud, the decoding process of each point in the point cloud is the same. In an example of the current point to be decoded in the point cloud, when determining the attribute information of the current point in the point cloud, it is required to obtain decoded points in the point cloud and select at least one neighbor point of the current point from these decoded points. A predicted value of the attribute information of the current point is obtained according to the rebuilt value of the attribute information of at least one neighbor point of the current point, and the rebuilt value of the attribute information of the current point is obtained according to the predicted value of the attribute information of the current point and a residual of the attribute information of the current point analyzed from the attribute code stream of the point cloud.

The current point to be decoded in this application includes N types of attribute information. For example, the current point includes a color attribute, a reflectivity attribute, a normal vector attribute, a material attribute, etc.

In some embodiments, the current point including N types of attribute information may be understood as all the points in the point cloud including N types of attribute information. The attribute information decoding process of all the points in the point cloud is the same as the attribute information decoding process of the current point. This embodiment of this application will describe the attribute information decoding process in an example of the current point.

S602: Determine M attribute groups of the N types of attribute information of the current point, M being a positive integer less than N.

S602 includes, but not limited to, the following manners:

Manner I: The point cloud code stream is decoded to obtain an indication information of the first operation shared during coding each type of attribute information in the N types of attribute information, and according to the indication information of the first operation shared during coding each type of attribute information, the attribute information sharing the first operation in the N types of attribute information of the current point is placed into a same attribute group to obtain M attribute groups of the current point.

Specifically, the coder side carries in the point cloud code stream the indication information of the first operation shared during coding each type of attribute information in the N types of attribute information. The indication information is used for indicating the first operation shared during coding the type of attribute information. In this way, after receiving the point cloud code stream, the decoder side may determine the first operation shared during coding the each type of attribute information according to the indication information of the first operation shared during coding each type of attribute information in the N types of attribute information in the point cloud code stream, and further place the attribute information sharing the same first operation in the N types of attribute information of the current point into one attribute group, thereby grouping the N types of attribute information of the current point to obtain the M attribute groups of the current point.

In some embodiments, the indication information of the first operation corresponding to each type of attribute information is used for indicating that the type of attribute information shares the neighbor point determination during determining the neighbor points, and/or that the type of attribute information shares the attribute predicted value calculation during calculating the attribute predicted value. In this way, the decoder side obtains that the attribute information of the current point has shared the neighbor point determination during attribute coding according to the indication information of the first operation, and further shares the neighbor point determination in the decoding process, thereby determining the neighbor points of the current point from the decoded points; and/or the decoder sider obtains that the attribute information of the current point has shared the attribute predicted value calculation during coding according to the indication information of the first operation, and further uses the same calculation manner of the attribute predicted value in the decoding process to obtain the predicted value of each attribute information in the attribute group.

Manner II: The N types of attribute information of the current point are grouped to obtain M attribute groups of the current point.

M is a positive integer less than N.

For example, the current point includes 4 types of different attribute information, and the 4 types of attribute information are placed into one attribute group. In this case, M=1.

For another example, the current point includes 4 types of different attribute information. 3 types of attribute information are placed into one attribute group, and the remaining one is placed in one attribute group. In this case, M=2.

For another example, the current point includes 4 types of different attribute information. 2 types of attribute information are placed into one attribute group, and the remaining 2 types of attribute information are placed in another attribute group. In this case, M=2.

For another example, the current point includes 4 types of different attribute information. 2 types of attribute information are placed into one attribute group, and the remaining 2 types of attribute information are respectively placed in two attribute groups. In this case, M=3.

As can be seen from the above, in the M attribute groups obtained by grouping the N types of attribute information of the current point in this embodiment, each attribute group includes at least one type of attribute information, and at least one of the M attribute groups includes at least two types of attribute information.

This application mainly describes the decoding process of the attribute group in an example where the attribute group includes at least two types of attribute information.

For the attribute decoding manner of the attribute group including one attribute information, reference may be made to the existing separate decoding manner, or the decoding manner of the attribute group including at least two types of attribute information.

In this embodiment, the manner of grouping the N types of attribute information of the current point may be a default manner, i.e., the decoder side and the coder side groups the attribute information in the same manner. For example, it is preset to place the attribute information in the N types of attribute information into one attribute group.

The grouping manners of attribute information of all the points in the point cloud may be the same or different, or partly the same and partly different, which is not limited in this application and is determined according to the actual situation.

After the N types of attribute information of the current point are placed into M attribute groups according to the above manner, S603 is executed.

S603: Perform uniform decoding, for attribute information in the same attribute group of the current point, using a first operation.

The first operation includes at least one of a neighbor point determination and an attribute predicted value calculation.

In this application, the performing uniform decoding, for attribute information in the same attribute group, using the first operation in attribute decoding may also be understood as performing the first operation decoding on each attribute information in the same attribute group as a whole. For example, when the first operation is the neighbor point determination, the first operation on the attribute information in the attribute group will determine neighbor points as a part or all of neighbor points, and these neighbor points are shared, which avoids time complexity due to repeated searching and further improves attribute decoding efficiency of the point cloud.

The attribute decoding processes of different attribute groups are independent of each other. For example, different groups of attribute information are decoded by different coding manners.

The first operation in this embodiment of this application is at least one of the neighbor point determination and the attribute predicted value calculation.

That is, the sharing the first operation in attribute decoding for each attribute information in the same attribute group to perform uniform decoding may be sharing the neighbor point determination for each attribute information in the same attribute group, i.e., each attribute information in the same attribute group shares the neighbor point determination to determine K neighbor points, and the K neighbor points are used as a part or all of neighbor points corresponding to each attribute information in the attribute group. Alternatively, each attribute information in the same attribute group shares the attribute predicted value calculation so as to be subjected to the uniform attribute predicted value calculation, for example, the calculation manners of the attribute predicted values of each attribute information in the attribute group may be the same. Alternatively, after each attribute information in the same attribute group shares the neighbor point determination such that the neighbor points are determined, the attribute predicted value calculation is shared, and the same calculation manner of the attribute predicted value is used to calculate the attribute predicted value of each attribute information in the attribute group.

In some embodiments, if the first operation includes the neighbor point determination, then the performing uniform decoding, for attribute information in the same attribute group of the current point, using a first operation in attribute decoding in S603 includes S603-A1 and S603-A2 as follows:

S603-A1: Search out, for each attribute group in the M attribute groups, K first neighbor points from decoded points of the point cloud as common neighbor points of each attribute information in the attribute group.

S603-A2: Determine, according to the corresponding attribute information of the K first neighbor points, a predicted value of each attribute information of the current point in the attribute group.

In an example, the K neighbor points determined are used as all of neighbor points of at least one attribute information in the attribute group.

In an example, the K neighbor points determined are used as a part of neighbor points of at least one attribute information in the attribute group.

For example, assuming that the color attribute and the reflectivity attribute of the current point are placed into one attribute group, for this attribute group, K first neighbor points are selected from the decoded points of the point cloud. The K first neighbor points are used as the common neighbor points of the color attribute and the reflectivity attribute of the current point, and the predicted value of the color attribute and the predicted value of the reflectivity attribute of the current point are respectively calculated according to the corresponding attribute information of the K first neighbor points. For example, the weighted average of the reflectivity attributes of the K first neighbor points is determined as the predicted value of the reflectivity attribute of the current point, and the weighted average of the color attributes of the K first neighbor points is determined as the predicted value of the color attribute of the current point.

In S603-A1, the manner of identifying the K first neighbor points from the decoded points of the point cloud includes, but not limited to, the following manners:

Manner I: According to the decoding sequence of the points in the point cloud, K first neighbor points having the shortest distance from the current point are selected from the decoded points of the point cloud.

Manner II: According to coordinate information of the points in the point cloud, K first neighbor points having the shortest distance from the current point are selected from the decoded points of the point cloud.

Manner III: According to coordinate information of the points in the point cloud, all decoded points having a distance less than or equal to a threshold d are searched out from the decoded points of the point cloud as the K first neighbor points of the current point.

The above-mentioned distance calculation manner may be Euclidean distance, Manhattan distance, weighted Manhattan distance, etc.

After the K first neighbor points are searched out from the decoded points of the point cloud according to S603-A1 as the common neighbor points of each attribute information in the attribute group, S603-A2 is executed: determine, according to the corresponding attribute information of the K first neighbor points, a predicted value of each attribute information of the current point in the attribute group.

The determining, according to the corresponding attribute information of the K first neighbor points, a predicted value of each attribute information of the current point in the attribute group in S603-A2 is implemented by, but not limited to, the following manners:

Manner I: For each attribute information in the attribute group, an identical predicted value calculation manner is used to calculate the predicted value of each attribute information of the current point in the attribute group according to the corresponding attribute information of the K first neighbor points.

In an example, the average of the first attribute information of the K first neighbor points is determined as the predicted value of the first attribute information of the current point. The first attribute information is any attribute information in the attribute group.

For example, the attribute group includes a color attribute and a reflectivity attribute of the current point. The average of the color attributes of the K first neighbor points is determined as the predicted value of the color attribute of the current point. The average of the reflectivity attributes of the K first neighbor points is determined as the predicted value of the reflectivity attribute of the current point.

In another example, the weighted average of the first attribute information of the K first neighbor points is determined as the predicted value of the first attribute information of the current point. The first attribute information is any attribute information in the attribute group.

For example, the attribute group includes a color attribute and a reflectivity attribute of the current point. The weighted average of the color attributes of the K first neighbor points is determined as the predicted value of the color attribute of the current point. The weighted average of the reflectivity attributes of the K first neighbor points is determined as the predicted value of the reflectivity attribute of the current point.

Manner II: For each attribute information in the attribute group, an unidentical predicted value calculation manner is used to calculate the predicted value of each attribute information of the current point in the attribute group according to the corresponding attribute information of the K first neighbor points.

In a first example of Manner II, for each attribute information in the attribute group, different predicted value calculation manners are used respectively, and the predicted value of each attribute information of the current point in the attribute group is calculated according to the corresponding attribute information of the K first neighbor points.

For example, the attribute group includes a color attribute and a reflectivity attribute of the current point. The calculation manner of the predicted value of the color attribute is different from the calculation manner of the predicted value of the reflectivity attribute. For example, the average of the color attributes of the K first neighbor points is determined as the predicted value of the color attribute the current point, and the weighted average of the reflectivity attributes of the K first neighbor points is determined as the predicted value of the reflectivity attribute of the current point. Alternatively, the weighted average of the color attributes of the K first neighbor points is determined as the predicted value of the color attribute of the current point, and the average of the reflectivity attributes of the K first neighbor points is determined as the predicted value of the reflectivity attribute of the current point.

In a second example of Manner II, for a second attribute information in the attribute group, a weighted average of the second attribute information of the K first neighbor points is determined as a predicted value of the second attribute information of the current point; and for a third attribute information in the attribute group, L second neighbor points are searched out from the decoded points of the point cloud, and according to the third attribute information of the K first neighbor points and the L second neighbor points, a predicted value of the third attribute information of the current point is determined. The second neighbor points are different from the first neighbor points, and the third attribute information is at least one attribute information in the attribute group other than the second attribute information.

For example, assuming that the attribute group includes a color attribute and a reflectivity attribute of the current point, the reflectivity attribute is denoted as the second attribute information, and the color attribute is denoted as the third attribute information. For the reflectivity attribute of the current point, the weighted average of the reflectivity attributes of the K first neighbor points is determined as the predicted value of the reflectivity attribute of the current point.

For the color attribute, on the basis of the K neighbor points, additional L second neighbor points are searched out. Specifically, L second neighbor points are searched out from the decoded points of the point cloud. The second neighbor points are different from the first neighbor points. In this case, the neighbor points for the color attribute of the current point include the K first neighbor points and the L second neighbor points, and further, the predicted value of the color attribute of the current point is determined according to the color attributes of the K first neighbor points and the L second neighbor points. For example, the weighted average of the color attributes of the K first neighbor points and the L second neighbor points is determined as the predicted value of the color attribute of the current point.

The identifying L second neighbor points from the decoded points of the point cloud at least includes:

Manner 1: The points having a distance of d2 from the current point are searched out from the decoded points. The points are different from the first neighbor points.

Manner 2: A first distance dl between a $K^{th}$ first neighbor point in the K first neighbor points and the current point is acquired; and the L second neighbor points having the first distance dl from the current point are searched out in the decoded points of the point cloud.

The above-mentioned distance calculation manner may be Euclidean distance, Manhattan distance, weighted Manhattan distance, etc.

The $K^{th}$ first neighbor point may be a first neighbor point having the largest distance from the current point in the K neighbor points.

According to the point cloud decoding method provided by the embodiments of this application, the point cloud code stream is decoded to obtain the current point to be decoded, the current point including N types of attribute information, and N being an integer greater than 1; the M attribute groups of the N types of attribute information of the current point are determined, M being a positive integer less than N; and for each attribute information in the same attribute group of the current point, the first operation in attribute decoding is shared to perform uniform decoding, the first operation including at least one of a neighbor point determination and an attribute predicted value calculation. That is, according to this application, the M attribute groups of the N types of attribute information of the current point are determined, and for each attribute information in the same attribute group, the first operation in attribute decoding is shared to perform uniform decoding, which avoids the repeated searching, reduces time complexity during attribute decoding and improves attribute decoding efficiency.

It is to be understood that the point cloud decoding method is the inverse process of the point cloud coding method. For the steps in the point cloud decoding method, reference may be made to the corresponding steps in the point cloud coding method. In order to avoid repetitions, details are not repeated here.

The preferred implementations of this application are described in detail above with reference to the accompanying drawings. However, this application is not limited to the specific details in the foregoing implementations, various simple variations may be made to the technical solutions of this application within the scope of the technical concept of this application. These simple variations are all within the protection scope of this application. For example, the specific technical features described in the foregoing specific implementations may be combined in any proper manner in a case of no conflict. In order to avoid unnecessary repetitions, various possible combinations are not explained separately in this application. For another example, any combination of different implementations of this application can be made as long as it does not deviate from the idea of this application, and it is also regarded as the contents of this application.

It is also to be understood that in various embodiments of this application, an order of sequence numbers of the foregoing processes does not indicate an execution sequence, and execution sequences of the processes are to be determined according to functions and internal logics thereof and are not to impose any limitation on an implementation process of the embodiments of this application.

The method embodiments of this application have been described in detail above in conjunction with FIG. 1 to FIG. 6. The apparatus embodiments of this application will be described in detail below in conjunction with FIG. 7 to FIG. 9.

Figure 7:
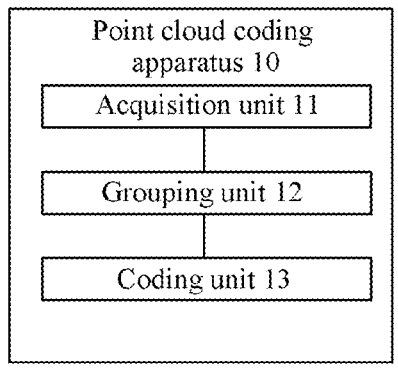
FIG. 7 is a schematic block diagram of a point cloud coding apparatus according to an embodiment of this application.

FIG. 7 is a schematic block diagram of a point cloud coding apparatus according to an embodiment of this application.

As shown in FIG. 7, the point cloud coding apparatus 10 may include:
an acquisition unit 11, configured to acquire a current point to be coded in a point cloud, the current point including N types of attribute information, and N being an integer greater than 1;
a grouping unit 12, configured to group the N types of attribute information of the current point to obtain M attribute groups of the current point, M being a positive integer less than N; and
a coding unit 13, configured to perform uniform encoding, for attribute information in a same attribute group of the current point, using a first operation, the first operation including at least one of a neighbor point determination and an attribute predicted value calculation.

In some embodiments, if the first operation includes a neighbor point determination, then the coding unit 13 is configured to search out, for each attribute group in the M attribute groups, K first neighbor points from coded points of the point cloud as common neighbor points of each attribute information in the attribute group; and determine, according to the corresponding attribute information of the K first neighbor points, a predicted value of each attribute information of the current point in the attribute group.

In some embodiments, the coding unit 13 is specifically configured to use, for each attribute information in the attribute group, an identical predicted value calculation manner to calculate the predicted value of each attribute information of the current point in the attribute group according to the corresponding attribute information of the K first neighbor points; or
use, for each attribute information in the attribute group, an unidentical predicted value calculation manner to calculate the predicted value of each attribute information of the current point in the attribute group according to the corresponding attribute information of the K first neighbor points.

In some embodiments, the coding unit 13 is specifically configured to determine a weighted average of a first attribute information of the K first neighbor points as a predicted value of the first attribute information of the current point, the first attribute information being any attribute information in the attribute group.

In some embodiments, the coding unit 13 is specifically configured to determine, for a second attribute information in the attribute group, a weighted average of the second attribute information of the K first neighbor points as a predicted value of the second attribute information of the current point; and search out, for a third attribute information in the attribute group, L second neighbor points from the coded points of the point cloud, and determine, according to the third attribute information of the K first neighbor points and the L second neighbor points, a predicted value of the third attribute information of the current point. The second neighbor points are different from the first neighbor points, and the third attribute information is at least one attribute information in the attribute group other than the second attribute information.

In some embodiments, the coding unit 13 is specifically configured to acquire a first distance between a $K^{th}$ first neighbor point in the K first neighbor points and the current point; and search out the L second neighbor points having the first distance from the current point in the coded points of the point cloud.

In some embodiments, the $K^{th}$ first neighbor point is a first neighbor point having the largest distance from the current point in the K neighbor points.

In some embodiments, the point cloud code stream includes an indication information of the first operation shared during coding each type of attribute information in the N types of attribute information.

In some embodiments, the indication information of the first operation corresponding to each type of attribute information is used for indicating that the type of attribute information shares the neighbor point determination during determining the neighbor points, and/or that the type of attribute information shares the attribute predicted value calculation during calculating the attribute predicted value.

It is to be understood that the apparatus embodiment and the method embodiment may be corresponding to each other, and for similar description, reference may be made to the method embodiment. In order to avoid repetitions, details are not repeated here. Specifically, the apparatus 10 shown in FIG. 7 may execute the embodiment of the above point cloud coding method, and the foregoing and other operations and/or functions of various modules in the apparatus 10 are respectively for realizing the method embodiment corresponding to the coding device. For the sake of brevity, details are not repeated here.

Figure 8:
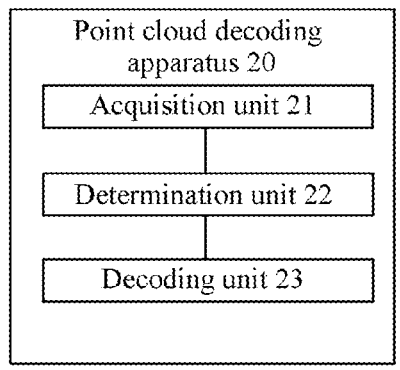
FIG. 8 is a schematic block diagram of a point cloud decoding apparatus according to an embodiment of this application.

FIG. 8 is a schematic block diagram of a point cloud decoding apparatus according to an embodiment of this application.

As shown in FIG. 8, the point cloud decoding apparatus 20 may include:

an acquisition unit 21, configured to decode a point cloud code stream to obtain a current point to be decoded, the current point including N types of attribute information, and N being an integer greater than 1;

a determination unit 22, configured to determine M attribute groups of the N types of attribute information of the current point, M being a positive integer less than N; and a decoding unit 23, configured to perform uniform decoding, for attribute information in the same attribute group of the current point, using a first operation, the first operation including at least one of a neighbor point determination and an attribute predicted value calculation.

In some embodiments, the determination unit 22 is specifically configured to obtain an indication information of the first operation shared during coding each type of attribute information in the N types of attribute information, and place, according to the indication information of the first operation shared during coding each type of attribute information, the attribute information sharing the first operation in the N types of attribute information of the current point into a same attribute group to obtain M attribute groups of the current point; or group the N types of attribute information of the current point to obtain M attribute groups of the current point.

In some embodiments, the indication information of the first operation corresponding to each type of attribute information is used for indicating that the type of attribute information shares the neighbor point determination during determining the neighbor points, and/or that the type of attribute information shares the attribute predicted value calculation during calculating the attribute predicted value.

In some embodiments, if the first operation includes a neighbor point determination, then the decoding unit 23 is configured to search out, for each attribute group in the M attribute groups, K first neighbor points from decoded points of the point cloud as common neighbor points of each attribute information in the attribute group; and determine, according to the corresponding attribute information of the K first neighbor points, a predicted value of each attribute information of the current point in the attribute group.

In some embodiments, the decoding unit 23 is specifically configured to use, for each attribute information in the attribute group, an identical predicted value calculation manner to calculate the predicted value of each attribute information of the current point in the attribute group according to the corresponding attribute information of the K first neighbor points; or use, for each attribute information in the attribute group, an unidentical predicted value calculation manner to calculate the predicted value of each attribute information of the current point in the attribute group according to the corresponding attribute information of the K first neighbor points.

In some embodiments, the decoding unit 23 is specifically configured to determine a weighted average of a first attribute information of the K first neighbor points as a predicted value of the first attribute information of the current point, the first attribute information being any attribute information in the attribute group.

In some embodiments, the decoding unit 23 is specifically configured to determine, for a second attribute information in the attribute group, a weighted average of the second attribute information of the K first neighbor points as a predicted value of the second attribute information of the current point; and search out, for a third attribute information in the attribute group, L second neighbor points from the decoded points of the point cloud, and determine, according to the third attribute information of the K first neighbor points and the L second neighbor points, a predicted value of the third attribute information of the current point. The second neighbor points are different from the first neighbor points, and the third attribute information is at least one attribute information in the attribute group other than the second attribute information.

In some embodiments, the decoding unit 23 is specifically configured to acquire a first distance between a $K^{th}$ first neighbor point in the K first neighbor points and the current point; and search out the L second neighbor points having the first distance from the current point in the decoded points of the point cloud.

In some embodiments, the $K^{th}$ first neighbor point is a first neighbor point having the largest distance from the current point in the K neighbor points.

It is to be understood that the apparatus embodiment and the method embodiment may be corresponding to each other, and for similar description, reference may be made to the method embodiment. In order to avoid repetitions, details are not repeated here. Specifically, the apparatus 20 shown in FIG. 8 may execute the embodiment of the point cloud decoding method, and the foregoing and other operations and/or functions of various modules in the apparatus 20 are respectively for realizing the method embodiment corresponding to the decoding device. For the sake of brevity, details are not repeated here.

The apparatus of this embodiment of this application has been described above in conjunction with the accompanying drawings from the perspective of a functional module. It is to be understood that the functional module may be realized by hardware or by instructions in software, and by a combination of hardware and software modules. Specifically, the steps in the method embodiment in this embodiment of this application may be completed by an integrated logic circuit of hardware and/or an instruction in the form of software in the processor, the steps of the method disclosed in combination with this embodiment of this application may be executed by a decoding processor directly embodied as hardware, or by a combination of hardware and software modules in the decoding processor. In some embodiments, the software module may be located in a storage medium that is mature in the art, such as a random access memory, a flash memory, a read-only memory, a programmable read-only memory, an electrically erasable programmable memory, or a register. The storage medium is located in the memory. The processor reads information in the memory and completes the steps of the method embodiments in combination with hardware thereof.

Figure 9:
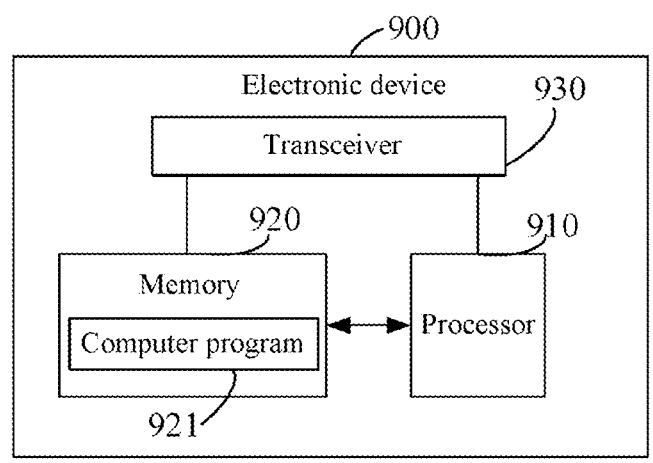
FIG. 9 is a schematic block diagram of an electronic device according to an embodiment of this application.

FIG. 9 is a schematic block diagram of an electronic device according to an embodiment of this application. The electronic device of FIG. 9 may be the point cloud coding device or point cloud decoding device described above, or have the functions of both the coding device and the decoding device.

As shown in FIG. 9, the electronic device 900 may include:

a memory 910 and a processor 920. The memory 910 is configured to store a computer program 911 and transmit the computer program 911 to the processor 920. In other words, the processor 920 may invoke and run the computer program 911 from the memory 910 to realize the methods in the embodiments of this application.

For example, the processor 920 may be configured to execute the steps in the method 200 according to the instructions in the computer program 911.

In some embodiments of this application, the processor 920 may include, but not limited to:

a general-purpose processor, a digital signal processor (DSP), an application-specific integrated circuit (ASIC), a field-programmable gate array (FPGA), or other programmable logic devices, discrete gate or transistor logic devices, and discrete hardware components.

In some embodiments of this application, the memory 910 includes, but not limited to:

a volatile memory and/or a non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM) serving as an external cache. Through illustrative but not limiting description, RAMs in many forms, for example, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct Rambus RAM (DRRAM), are available.

In some embodiments of this application, the computer program 911 may be divided into one or more modules. The one or more modules are stored in the memory 910 and executed by the processor 920 to complete the page recording method provided by this application. The one or more modules may be a series of computer program instruction segments that can complete specific functions, and the instruction segments are used for describing the execution process of the computer program 911 in the electronic device 900.

As shown in FIG. 9, the electronic device 900 may further include:

a transceiver 930. The transceiver 930 may be connected to the processor 920 or the memory 910.

The processor 920 may control the transceiver 930 to communicate with other devices, and specifically, may transmit information or data to other devices or receive information or data transmitted by other devices. The transceiver 930 may include a transmitter and a receiver. The transceiver 930 may further include one or more antennae.

It is to be understood that various components in the electronic device 900 are connected through a bus system, and in addition to a data bus, the bus system may include a power bus, a control bus and a status signal bus.

According to one aspect, this application provides a computer storage medium storing a computer program therein, the computer program, when executed by a computer, causing the computer to execute the method in the method embodiment. In other words, this embodiment of this application further provides a computer program product including instructions, the instructions, when executed by a computer, causing the computer to execute the method in the method embodiment.

According to another aspect, this application provides a computer program product or computer program. The computer program product or computer program includes a computer instruction stored in a computer-readable storage medium. A processor of a computer device reads the computer instruction from the computer-readable storage medium. The processor executes the computer instruction such that the computer device executes the method in the method embodiment.

In other words, when software is used for implementation, implementation may be entirely or partially performed in the form of a computer program product. The computer program product includes one or more computer instructions. When the computer program instruction is loaded and executed on a computer, all or part of the flow or function according to the embodiments of this application is generated. The computer may be a general-purpose computer, a special-purpose computer, a computer network, or another programmable apparatus. The computer instruction may be stored in a computer-readable storage medium or transmitted from one computer-readable storage medium to another computer-readable storage medium. For example, the computer instruction may be transmitted from one website, computer, server or data center to another website, computer, server or data center in a wired (for example, a coaxial cable, an optical fiber or a digital subscriber line (DSL)) or wireless (for example, infrared, wireless or microwave) manner. The computer-readable storage medium may be any available medium capable of being accessed by a computer or include one or more data storage devices integrated by an available medium, such as a server and a data center. The available medium may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not considered that the implementation goes beyond the scope of this application.

In the several embodiments provided in this application, it is understood that the disclosed system, apparatus, and method may be implemented in other manners. For example, the foregoing described apparatus embodiments are merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and the parts displayed as modules may or may not be physical modules, i.e., may be located in one position, or may be distributed on a plurality of network units. Some or all of the modules may be selected according to actual needs to achieve the objectives of the solutions of the embodiments. For example, functional modules in the embodiments of in this application may be integrated into one processing module, or each of the modules may exist alone physically, or two or more modules are integrated into one module. In this application, the term "module" and the term "unit" are used interchangeably.

The above contents are merely specific implementations of this application, but the protection scope of this application is not limited thereto. Any variation or replacement readily figured out by a person skilled in the art within the technical scope disclosed in this application is to fall within the protection scope of this application. Therefore, the protection scope of this application is to be subject to the appended claims.

What is claimed is:

1. A point cloud coding method performed by an electronic device, the method comprising:
   acquiring a current point to be coded in a point cloud, the current point comprising N types of attribute information, and N being an integer greater than 1;
   grouping the N types of attribute information of the current point to obtain M attribute groups of the current point, M being a positive integer less than N; and
   performing uniform attribute coding for attribute information in a same attribute group of the current point using a first operation, the first operation comprising at least one of a neighbor point determination and an attribute predicted value calculation.

2. The method according to claim 1, wherein the first operation comprises the neighbor point determination, the perform uniform attribute coding for attribute information in a same attribute group of the current point using a first operation comprises:
   identifying, for each attribute group in the M attribute groups, K first neighbor points of the current point from coded points of the point cloud as common neighbor points of each attribute information in the attribute group; and
   determining, according to the corresponding attribute information of the K first neighbor points, a predicted value of each attribute information of the current point in the attribute group.

3. The method according to claim 2, wherein the determining, according to the corresponding attribute information of the K first neighbor points, a predicted value of each attribute information of the current point in the attribute group comprises:
   using, for each attribute information in the attribute group, an identical predicted value calculation manner to calculate the predicted value of each attribute information of the current point in the attribute group according to the corresponding attribute information of the K first neighbor points; or
   using, for each attribute information in the attribute group, an unidentical predicted value calculation manner to calculate the predicted value of each attribute information of the current point in the attribute group according to the corresponding attribute information of the K first neighbor points.

4. The method according to claim 3, wherein the using, for each attribute information in the attribute group, an identical predicted value calculation manner to calculate the predicted value of each attribute information of the current point in the attribute group according to the corresponding attribute information of the K first neighbor points comprises:
   determining a weighted average of a first attribute information of the K first neighbor points as a predicted value of the first attribute information of the current point, the first attribute information being any attribute information in the attribute group.

5. The method according to claim 3, wherein the using, for each attribute information in the attribute group, an unidentical predicted value calculation manner to calculate the predicted value of each attribute information of the current point in the attribute group according to the corresponding attribute information of the K first neighbor points comprises:
   determining, for a second attribute information in the attribute group, a weighted average of the second attribute information of the K first neighbor points as a predicted value of the second attribute information of the current point; and
   identifying, for a third attribute information in the attribute group, L second neighbor points from the coded points of the point cloud, and determining, according to the third attribute information of the K first neighbor points and the L second neighbor points, a predicted value of the third attribute information of the current point;
   wherein the second neighbor points are different from the first neighbor points, and the third attribute information is at least one attribute information in the attribute group other than the second attribute information.

6. The method according to claim 5, wherein the searching out L second neighbor points from the coded points of the point cloud comprises:
   acquiring a first distance between a $K^{th}$ first neighbor point in the K first neighbor points and the current point; and
   searching out the L second neighbor points having the first distance from the current point in the coded points of the point cloud.

7. The method according to claim 6, wherein the $K^{th}$ first neighbor point is a first neighbor point having the largest distance from the current point in the K neighbor points.

8. The method according to claim 6, wherein the indication information of the first operation corresponding to each type of attribute information indicates that the type of attribute information shares the neighbor point determination during determining the neighbor points, and/or that the type of attribute information shares the attribute predicted value calculation during calculating the attribute predicted value.

9. The method according to claim 1, wherein a point cloud code stream comprises an indication information of the first operation during coding each type of attribute information in the N types of attribute information.

10. A point cloud decoding method, comprising:
    obtaining a current point to be decoded from a point cloud code stream, the current point comprising N types of attribute information, and N being an integer greater than 1;
    determining M attribute groups of the N types of attribute information of the current point, M being a positive integer less than N; and
    perform uniform decoding for each attribute information in a same attribute group of the current point using a first operation, the first operation comprising at least one of a neighbor point determination and an attribute predicted value calculation.

11. The method according to claim 10, wherein the determining M attribute groups of the N types of attribute information of the current point comprises:
    obtaining, from the point cloud code stream, an indication of the first operation performed during coding each type of attribute information in the N types of attribute information; and determining the M attribute groups of the N types of attribute information of the current point by placing the attribute information corresponding to the first operation in the N types of attribute information of the current point into a same attribute group or grouping the N types of attribute information of the current point.

12. The method according to claim 11, wherein the indication of the first operation corresponding to each type of attribute information indicates that the type of attribute information shares the neighbor point determination during determining the neighbor points, and/or that the type of attribute information shares the attribute predicted value calculation during calculating the attribute predicted value.

13. The method according to claim 10, wherein when the first operation comprises the neighbor point determination, the perform uniform decoding for each attribute information in a same attribute group of the current point using a first operation comprises:
identifying, for each attribute group in the M attribute groups, K first neighbor points from decoded points of the point cloud as common neighbor points of each attribute information in the attribute group; and
determining, according to the corresponding attribute information of the K first neighbor points, a predicted value of each attribute information of the current point in the attribute group.

14. The method according to claim 13, wherein the determining, according to the corresponding attribute information of the K first neighbor points, a predicted value of each attribute information of the current point in the attribute group comprises:
using, for each attribute information in the attribute group, an identical predicted value calculation manner to calculate the predicted value of each attribute information of the current point in the attribute group according to the corresponding attribute information of the K first neighbor points; or
using, for each attribute information in the attribute group, an unidentical predicted value calculation manner to calculate the predicted value of each attribute information of the current point in the attribute group according to the corresponding attribute information of the K first neighbor points.

15. The method according to claim 14, wherein the using, for each attribute information in the attribute group, an identical predicted value calculation manner to calculate the predicted value of each attribute information of the current point in the attribute group according to the corresponding attribute information of the K first neighbor points comprises:
determining a weighted average of a first attribute information of the K first neighbor points as a predicted value of the first attribute information of the current point, the first attribute information being any attribute information in the attribute group.

16. The method according to claim 14, wherein the using, for each attribute information in the attribute group, an unidentical predicted value calculation manner to calculate the predicted value of each attribute information of the current point in the attribute group according to the corresponding attribute information of the K first neighbor points comprises:
determining, for a second attribute information in the attribute group, a weighted average of the second attribute information of the K first neighbor points as a predicted value of the second attribute information of the current point; and
searching out, for a third attribute information in the attribute group, L second neighbor points from the decoded points of the point cloud, and determining, according to the third attribute information of the K first neighbor points and the L second neighbor points, a predicted value of the third attribute information of the current point;
wherein the second neighbor points are different from the first neighbor points, and the third attribute information is at least one attribute information in the attribute group other than the second attribute information.

17. The method according to claim 16, wherein the searching out L second neighbor points from the decoded points of the point cloud comprises:
acquiring a first distance between a $K^{th}$ first neighbor point in the K first neighbor points and the current point; and
searching out the L second neighbor points having the first distance from the current point in the decoded points of the point cloud.

18. The method according to claim 17, wherein the $K^{th}$ first neighbor point is a first neighbor point having the largest distance from the current point in the K neighbor points.

19. An electronic device, comprising:
a processor and a memory, the memory being configured to store a computer program that, when executed by the processor, causes the electronic device to perform a point cloud coding method, the method comprising:
obtaining a current point to be decoded from a point cloud code stream, the current point comprising N types of attribute information, and N being an integer greater than 1;
determining M attribute groups of the N types of attribute information of the current point, M being a positive integer less than N; and
perform uniform decoding for each attribute information in a same attribute group of the current point using a first operation, the first operation comprising at least one of a neighbor point determination and an attribute predicted value calculation.

20. A non-transitory computer-readable storage medium storing a computer program, the computer program, when executed by a processor of an electronic device, causing the electronic device to perform a point cloud coding method, the method comprising:
obtaining a current point to be decoded from a point cloud code stream, the current point comprising N types of attribute information, and N being an integer greater than 1;
determining M attribute groups of the N types of attribute information of the current point, M being a positive integer less than N; and
perform uniform decoding for each attribute information in a same attribute group of the current point using a first operation, the first operation comprising at least one of a neighbor point determination and an attribute predicted value calculation.

* * * * *